US010106191B2

(12) United States Patent  
Gotou et al.

(10) Patent No.: US 10,106,191 B2  
(45) Date of Patent: Oct. 23, 2018

(54) ELECTRIC POWER STEERING DEVICE

(71) Applicant: KYB Corporation, Minato-ku, Tokyo (JP)

(72) Inventors: Hiroyuki Gotou, Gifu (JP); Noboru Yoshida, Gifu (JP); Yuichiro Okamoto, Hessen (DE); Nobuyuki Kimura, Ota (JP); Takayuki Nagase, Gunma (JP); Kazuma Yamazaki, Gyoda (JP)

(73) Assignee: KYB Corporation, Tokyo (JP)

( * ) Notice: Subject to any disclaimer, the term of this patent is extended or adjusted under 35 U.S.C. 154(b) by 44 days.

(21) Appl. No.: 15/116,507

(22) PCT Filed: Feb. 4, 2015

(86) PCT No.: PCT/JP2015/053091  
§ 371 (c)(1),  
(2) Date: Aug. 3, 2016

(87) PCT Pub. No.: WO2015/119150  
PCT Pub. Date: Aug. 13, 2015

(65) Prior Publication Data  
US 2016/0347358 A1    Dec. 1, 2016

(30) Foreign Application Priority Data

Feb. 4, 2014    (JP) ................................. 2014-019420

(51) Int. Cl.  
*B62D 5/04*    (2006.01)

(52) U.S. Cl.  
CPC ......... *B62D 5/0466* (2013.01); *B62D 5/0463* (2013.01)

(58) Field of Classification Search  
CPC ............................. B62D 5/0466; B62D 5/0463  
(Continued)

(56) References Cited

U.S. PATENT DOCUMENTS

| 4,875,540 | A | * | 10/1989 | Oshita ................. B62D 5/0466 |
| | | | | 180/446 |
| 2002/0060538 | A1 | * | 5/2002 | Hara .................... B62D 5/0466 |
| | | | | 318/432 |

(Continued)

FOREIGN PATENT DOCUMENTS

JP    2007-320383 A    12/2007

*Primary Examiner* — Nadeem Odeh  
(74) *Attorney, Agent, or Firm* — Hauptman Ham, LLP

(57) ABSTRACT

An electric power steering device includes a basic return command value calculation unit configured to calculate a basic return command value in a direction to return a steering wheel to a neutral position on the basis of a steering angle of a steering wheel, a turn/return determination unit configured to determine the turn and the return of the steering wheel, a gradually changing return command value calculation unit configured to calculate a gradually changing return command value, the gradually changing return command value gradually increasing, while the return of the steering wheel is determined by the turn/return determination unit, and a return command value calculation unit configured to calculate a return command value by adding the gradually changing return command value to the basic return command value. The electric motor is driven by adding the return command value to the assist command value.

6 Claims, 6 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2005/0154514 A1* | 7/2005 | Niessen | ................. | B62D 6/008 |
| | | | | 701/41 |
| 2008/0167780 A1* | 7/2008 | Suzuki | ................. | B62D 5/0466 |
| | | | | 701/42 |
| 2009/0192679 A1* | 7/2009 | Kobayashi | ........... | B62D 5/0463 |
| | | | | 701/42 |

* cited by examiner

ELECTRIC POWER STEERING DEVICE

RELATED APPLICATIONS

The present application is a National Phase entry of International Application No. PCT/JP2015/053091, filed Feb. 4, 2015, which claims priority of Japanese Application No. 2014-019420, filed Feb. 4, 2014.

TECHNICAL FIELD

The present invention relates to an electric power steering device.

BACKGROUND ART

Some of conventional electric power steering devices execute a steering wheel return control utilizing an electric motor for steering assist.

JP2007-320383A discloses an electric power steering device configured to calculate a steering wheel return correction current value on the basis of a steering angle and, when it is determined to execute a steering wheel return control, correct an assist base current value using the steering wheel return correction current value and execute the steering wheel return control.

SUMMARY OF INVENTION

Since a steering system is asymmetric when a steering angle of a steering wheel is on a rightward turning side and on a leftward turning side from a neutral position in an electric power steering device, there is possibly a left/right difference in a remaining steering angle of the steering wheel near the neutral position even if the steering wheel return correction current value is calculated on the basis of the steering angle and the steering wheel return control is executed as described in JP2007-320383A. That is, there is a possibility of such a situation that the steering wheel returns to the neutral position at the time of a return made by releasing the steering wheel after the steering wheel is turned rightward, whereas the steering wheel does not completely return to the neutral position at the time of a return made by releasing the steering wheel after the steering wheel is turned leftward.

The present invention aims to reduce a left/right difference of a remaining steering angle of a steering wheel.

According to one aspect of the present invention, an electric power steering device for driving an electric motor using an assist command value calculated on the basis of a detection result of a torque sensor for detecting a steering torque input from a steering wheel is provided. The electric power steering device includes: a basic return command value calculation unit configured to calculate a basic return command value in a direction to return the steering wheel to a neutral position on the basis of a steering angle of the steering wheel; a turn/return determination unit configured to determine the turn and the return of the steering wheel; a gradually changing return command value calculation unit configured to calculate a gradually changing return command value, the gradually changing return command value gradually increasing, while the return of the steering wheel is determined by the turn/return determination unit; and a return command value calculation unit configured to calculate a return command value by adding the gradually changing return command value to the basic return command value. The electric motor is driven by adding the return command value to the assist command value.

DESCRIPTION OF EMBODIMENT

Hereinafter, an embodiment of the present invention is described with reference to the drawings.

Figure 1:
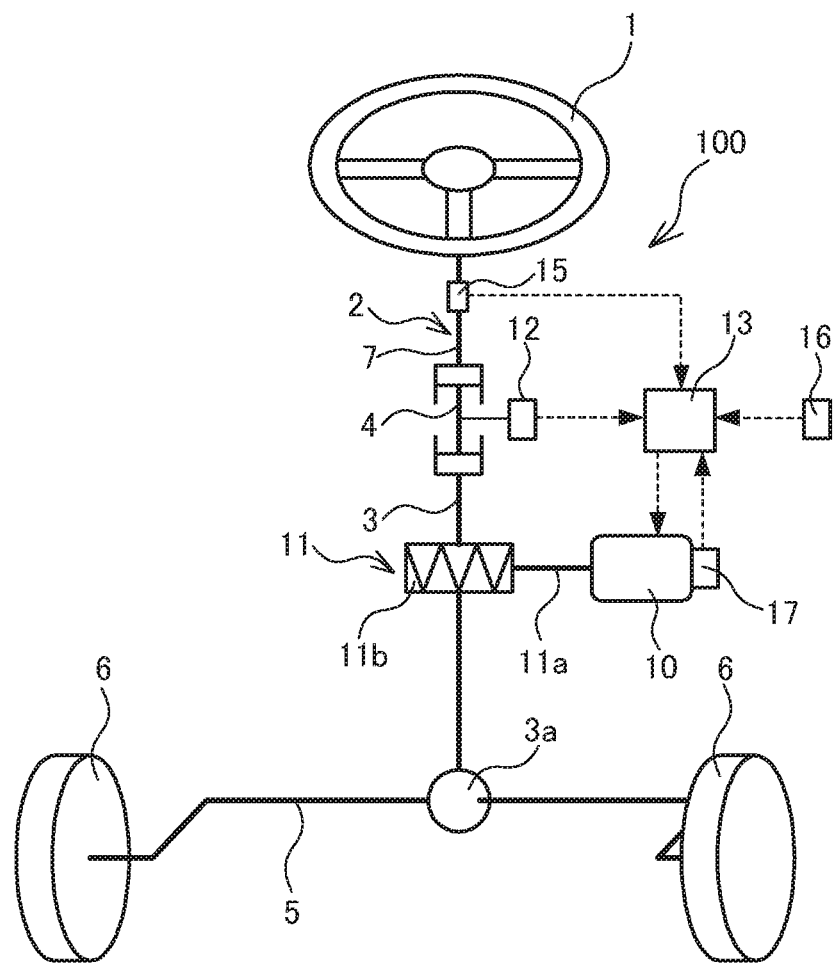
FIG. 1 is a configuration diagram of an electric power steering device according to an embodiment of the present invention.

First, the overall configuration of an electric power steering device 100 according to the embodiment of the present invention is described with reference to FIG. 1.

The electric power steering device 100 includes an input shaft 7 configured to rotate as a steering wheel 1 is operated by a driver, an output shaft 3 having a lower end linked to a rack shaft 5 and a torsion bar 4 coupling the input shaft 7 and the output shaft 3. The electric power steering device 100 turns wheels 6 by moving the rack shaft 5 meshed with a pinion 3a provided on the lower end of the output shaft 3 in an axial direction. A steering shaft 2 is configured by the input shaft 7 and the output shaft 3.

The electric power steering device 100 further includes an electric motor 10 as a drive source for assisting the steering of the steering wheel 1 by the driver, a speed reducer 11 for transmitting the rotation of the electric motor 10 to the steering shaft 2 while decelerating it, a torque sensor 12 for detecting a steering torque input from the steering wheel 1 and a controller 13 for controlling the drive of the electric motor 10 on the basis of a detection result of the torque sensor 12.

The electric motor 10 is provided with a resolver 17 serving as an angle detector for detecting a rotational angle of the electric motor 10. A detection result of the resolver 17 is output to a motor rotation speed calculation unit 18 of the controller 13. The motor rotation speed calculation unit 18 calculates a rotation speed of the electric motor 10 on the basis of the detection result of the resolver 17, calculates it as a rotation speed with a (+) sign when the steering wheel 1 rotates rightward and calculates it as a rotation speed with a (−) sign when the steering wheel 1 rotates leftward. In the present embodiment, the resolver 17 provided on the electric motor 10 and the motor rotation speed calculation unit 18 of the controller 13 serve as a rotation speed detector for detecting the rotation speed of the electric motor 10.

The speed reducer 11 is composed of a worm shaft 11a coupled to an output shaft of the electric motor 10 and a worm wheel 11b coupled to the output shaft 3 and meshed with the worm shaft 11a. A torque output by the electric motor 10 is transmitted to the worm wheel 11b from the worm shaft 11a and applied as an assist torque to the output shaft 3.

The torque sensor 12 detects the steering torque applied to the torsion bar 4 on the basis of the relative rotation of the input shaft 7 and the output shaft 3. A detection result of the torque sensor 12 is output to the controller 13. The torque sensor 12 outputs 0 Nm as a steering torque if there is no relative rotation of the input shaft 7 and the output shaft 3. Further, the torque sensor 12 outputs a steering torque with a (+) sign when the steering wheel 1 is steered rightward, whereas the torque sensor 12 outputs a steering torque with a (−) sign when the steering wheel 1 is steered leftward. The controller 13 calculates a torque output by the electric motor 10 on the basis of the detection result of the torque sensor 12 and controls the drive of the electric motor 10 to generate the calculated torque. In this way, the electric power steering device 100 drives the electric motor 10 on the basis of the detection result of the torque sensor 12 for detecting the steering torque input from the steering wheel 1 and assists the steering of the steering wheel 1 by the driver.

The steering shaft 2 is provided with a steering angle sensor 15 serving as a steering angle detector for detecting a steering angle of the steering wheel 1. A detection result of the steering angle sensor 15 is output to the controller 13. The steering angle sensor 15 outputs 0° as a steering angle if the steering wheel 1 is at a neutral position. Further, a steering angle with a (+) sign is output according to the rotation of the steering wheel 1 if the steering wheel 1 is steered rightward from the neutral position, whereas a steering angle with a (−) sign is output according to the rotation of the steering wheel 1 if the steering wheel 1 is steered leftward from the neutral position.

A detection result of a vehicle speed sensor 16 as a vehicle speed detector for detecting a vehicle speed is input to the controller 13.

The controller 13 includes a CPU for controlling the operation of the electric motor 10, a ROM storing control programs, set values and the like necessary for the processing operation of the CPU and a RAM for temporarily storing information detected by various sensors such as the torque sensor 12, the resolver 17, the steering angle sensor 15 and the vehicle speed sensor 16.

During the travel of the vehicle, a self-aligning torque trying to return to a straight traveling state acts on the wheels 6. This self-aligning torque is small during low-speed travel although it is large during high-speed travel. In a low-speed region where the self-aligning torque is small, the returnability of the steering wheel 1 to the neutral position is deteriorated due to the friction of gears of a steering system such as the worm shaft 11a and the worm wheel 11b. Thus, during low-speed travel, the steering wheel 1 may not completely return to the neutral position even if the steering wheel 1 is released from a turned state. Accordingly, a return control for improving the returnability of the steering wheel 1 to the neutral position even in the low-speed region is executed in the electric power steering device 100.

Next, a control of the electric motor 10 by the controller 13 is described with reference to FIGS. 2 to 6.

Figure 2:
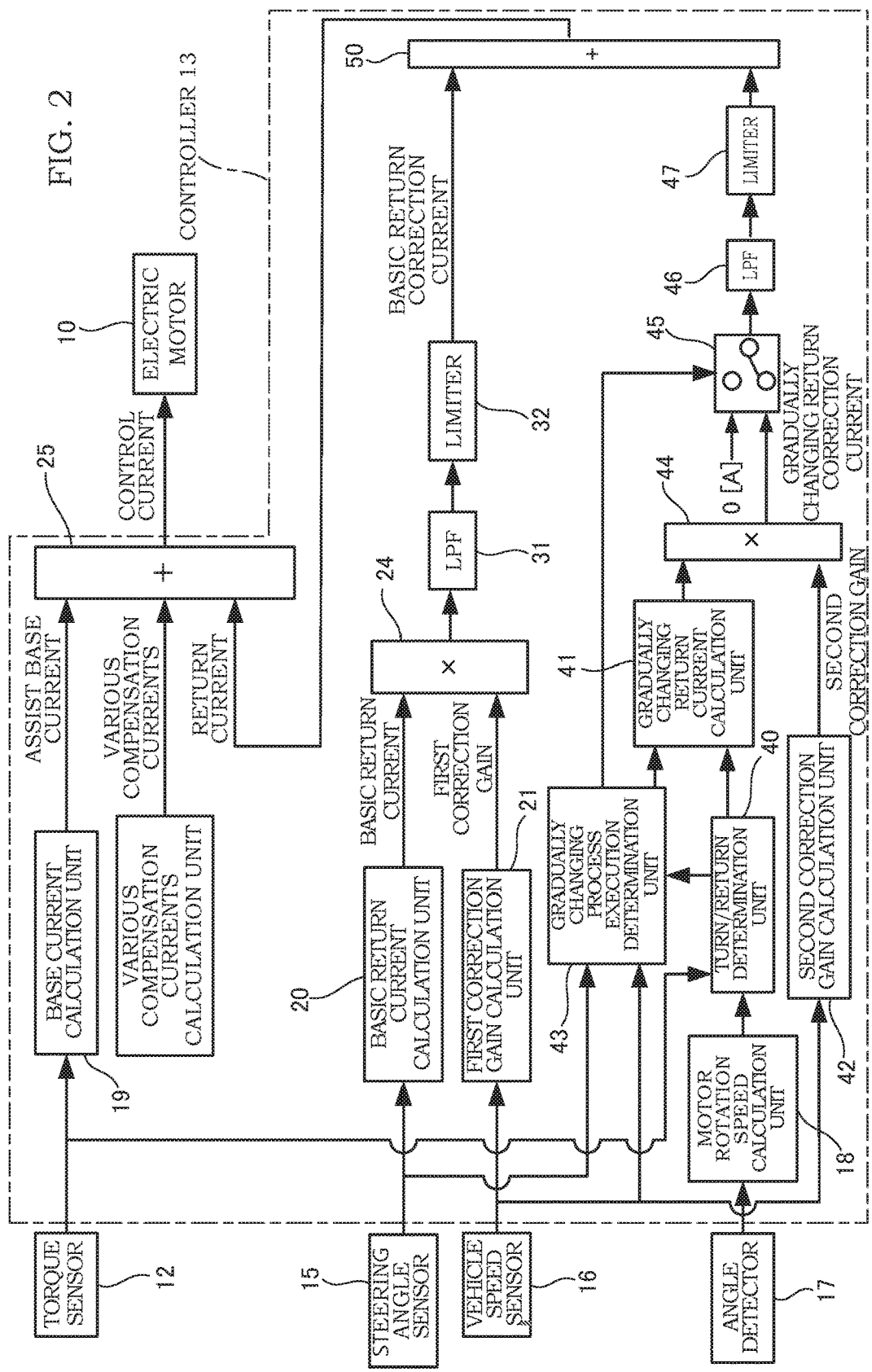
FIG. 2 is a control block diagram of the electric power steering device according to the embodiment of the present invention.

As shown in FIG. 2, the controller 13 includes a base current calculation unit 19 for calculating an assist base current (assist command value) for assisting the steering of the steering wheel 1 by the driver on the basis of the detection result of the torque sensor 12.

The controller 13 further includes a basic return current calculation unit (basic return command value calculation unit) 20 for calculating a basic return current (basic return command value) in a direction to return the steering wheel 1 to the neutral position, a first correction gain calculation unit 21 for calculating a first correction gain for correcting the basic return current and a multiplication unit 24 serving as a basic return command value correction unit for calculating a basic return correction current by multiplying the basic return current and the first correction gain.

The controller 13 further includes a turn/return determination unit 40 for determining the turn and the return of the steering wheel 1, a gradually changing return current calculation unit (gradually changing return command value calculation unit) 41 for calculating a gradually changing return current (gradually changing return command value) in a direction to return the steering wheel 1 to the neutral position, a second correction gain calculation unit 42 for calculating a second correction gain for correcting the gradually changing return current, a gradually changing process execution determination unit 43 for determining whether or not to execute a gradually changing process of adding a gradually changing return correction current to the basic return correction current, and a multiplication unit 44 as a gradually changing return command value correction unit for calculating the gradually changing return correction current by multiplying the gradually changing return current and the second correction gain.

The controller 13 further includes an addition unit (return command value calculation unit) 50 for calculating a return current (return command value) by adding the basic return correction current calculated by the multiplication unit 24 and the gradually changing return correction current calculated by the multiplication unit 44. The return current is added to the assist base current by an addition unit 25.

In the addition unit 25, various compensation currents for compensating for the friction of the gears and the like are also added besides the assist base current and the return current and the resulting current is output as a control current for controlling the drive of the electric motor 10 to the electric motor 10.

As described above, the electric motor 10 is controlled by the control current obtained by adding the return current in the direction to return the steering wheel 1 to the neutral position to the assist base current for assisting the steering of the steering wheel 1 by the driver.

The return control is described below.

First, a basic return correction current calculation method is described in detail with reference to FIGS. 2 to 4.

The basic return current calculation unit 20 calculates the basic return current in the direction to return the steering wheel 1 to the neutral position on the basis of the detection result of the steering angle sensor 15. Specifically, the basic return current corresponding to the steering angle input from the steering angle sensor 15 is calculated by referring to a basic return current calculation map shown in FIG. 3. The basic return current is a basic current of the return control.

Figure 3:
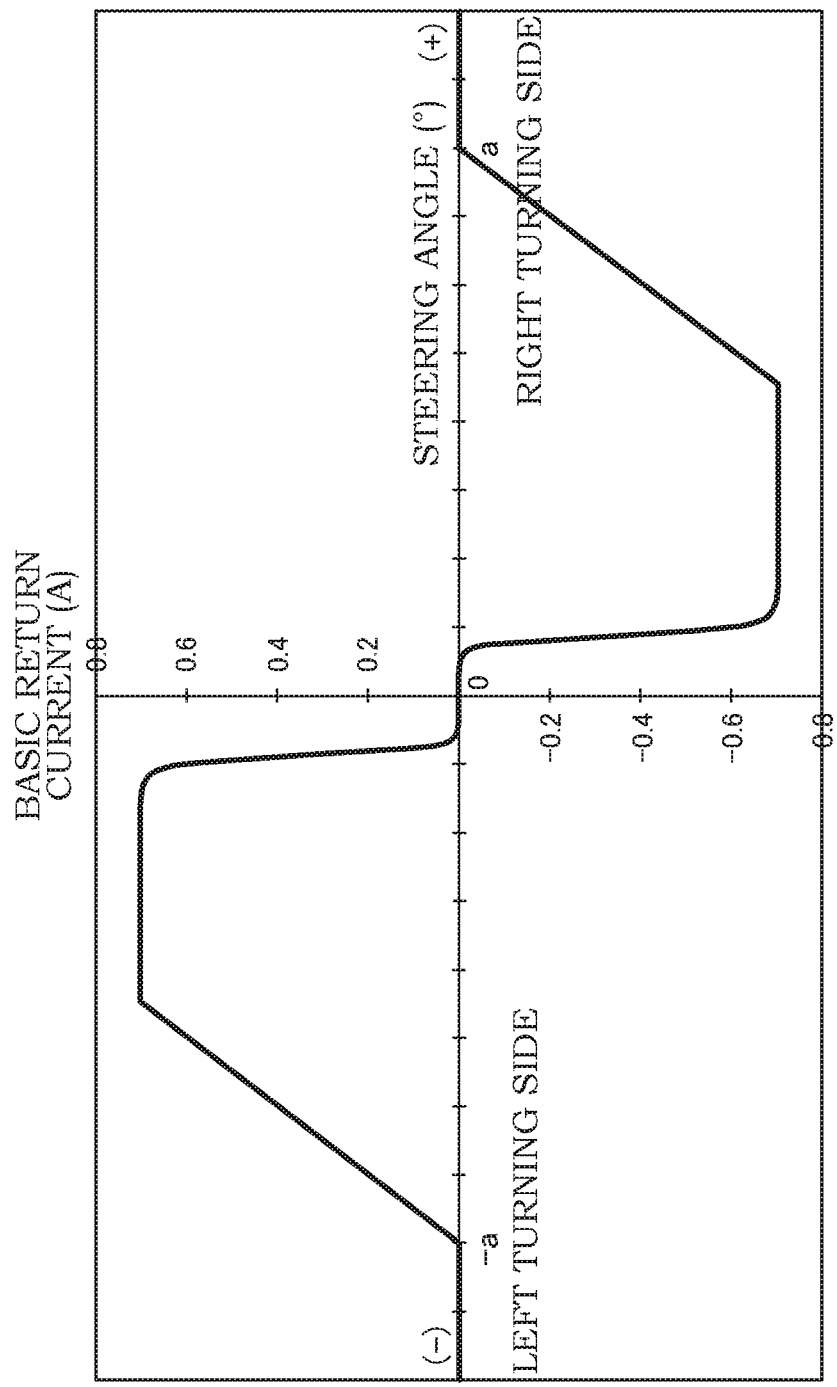
FIG. 3 is a basic return current calculation map chart for calculating a basic return current.

The basic return current calculation map shown in FIG. 3 is a map specifying a relationship of the steering angle and the basic return current, wherein a horizontal axis represents the steering angle and a vertical axis represents the basic return current. A (+) side of the horizontal axis indicates the steering angle on a right turning side from the neutral position and a (−)side indicates the steering angle on a left turning side from the neutral position. Further, a (+) side of the vertical axis indicates the basic return current for assisting the rightward rotation of the steering wheel 1 and a (−)side indicates the basic return current for assisting the leftward rotation of the steering wheel 1. As understood from FIG. 3, in a characteristic of the basic return current calculation map, the basic return current has a value for assisting the leftward rotation of the steering wheel 1 when the steering angle is on the rightward turning side and has a value for assisting the rightward rotation of the steering wheel 1 when the steering angle is on the leftward turning side. As just described, the basic return current is a current in the direction to return the steering wheel 1 to the neutral position.

The basic return current calculation map shown in FIG. 3 is described in detail. The basic return current is set in a dead zone to be zero near the neutral position of the steering wheel 1. This is to prevent the occurrence of a disturbance due to a detection error of the steering angle sensor 15. If an absolute value of the steering angle increases to be larger than the dead zone, an absolute value of the basic return current increases with a predetermined gradient. By adjusting this gradient, a return feeling sensed by the driver when the steering wheel 1 returns to the neutral position can be changed. When the gradient is set large, the return feeling is large. The basic return current is set at zero in a range where the absolute value of the steering angle is equal to or more than a predetermined value of a°. This is because the basic return current acts only near the neutral position and is prevented from acting when the steering wheel 1 is largely turned since the basic return current acts to increase a steering force by the driver when the steering wheel 1 is turned. This is also to suppress a sudden return in returning the largely turned steering wheel 1.

The first correction gain calculation unit 21 calculates the first correction gain for correcting the basic return current on the basis of the detection result of the vehicle speed sensor 16. Specifically, the first correction gain corresponding to the vehicle speed input from the vehicle speed sensor 16 is calculated by referring to a first correction map shown in FIG. 4. Since the self-aligning torque changes according to the vehicle speed, the basic return current is corrected by the first correction gain that changes according to the vehicle speed.

Figure 4:
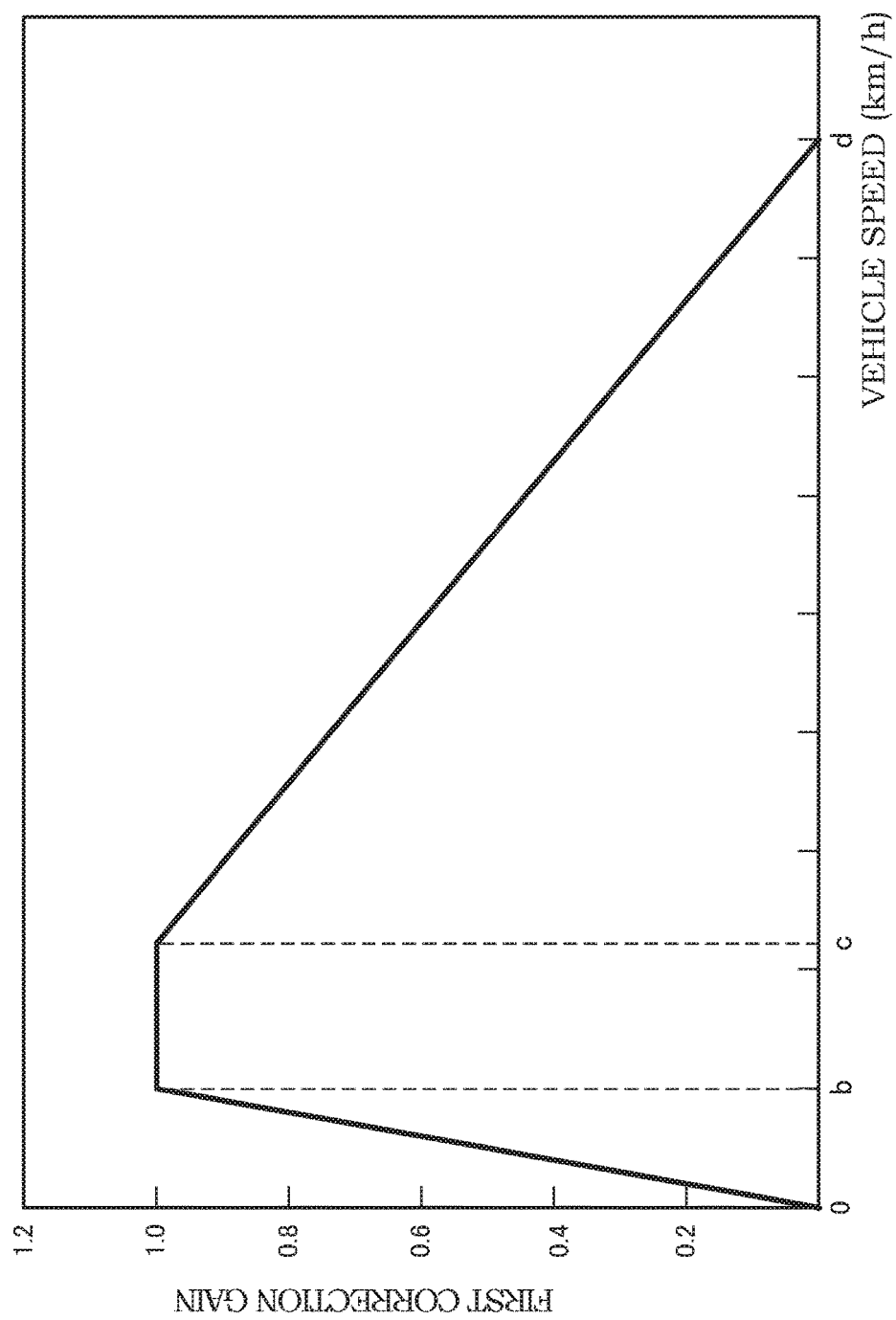
FIG. 4 is a first correction map chart for calculating a first correction gain.

The first correction map shown in FIG. 4 is a map specifying a relationship of the vehicle speed and the first correction gain, wherein a horizontal axis represents the vehicle speed and a vertical axis represents the first correction gain. The first correction gain is set to be equal to or less than 1.0 in the entire vehicle speed region. That is, the first correction gain is a value for reducing the basic return current. Since the self-aligning torque is large during high-speed travel and small during low-speed travel, the first correction gain is set at 1.0 in a low-speed region where the vehicle speed is b to c km/h, set at a smaller value as the vehicle speed increases in a medium/high-speed region where the vehicle speed is equal to or more than c km/h and set at zero at a predetermined speed of d km/h or higher as shown in FIG. 4. Further, in a very low-speed region where the vehicle speed is equal to or less than b km/h, the first correction gain is set at a smaller value as the vehicle speed decreases. The first correction gain is set to decrease with a predetermined gradient in this way to reduce a sense of incongruity in steering caused when the vehicle is stopped and the first correction gain becomes zero.

The basic return current calculated by the basic return current calculation unit 20 and the first correction gain calculated by the first correction gain calculation unit 21 are processed by a low-pass filter 31 and an upper/lower limit value limiter 32 and output as the basic return correction current to the addition unit 50 after being multiplied by the multiplication unit 24.

The basic return correction current obtained by correcting the basic return current in the direction to return the steering wheel 1 to the neutral position by the first correction gain is set at a large value in the low-speed region and set at a smaller value as the vehicle speed increases in the medium/high-speed region.

Figure 5:
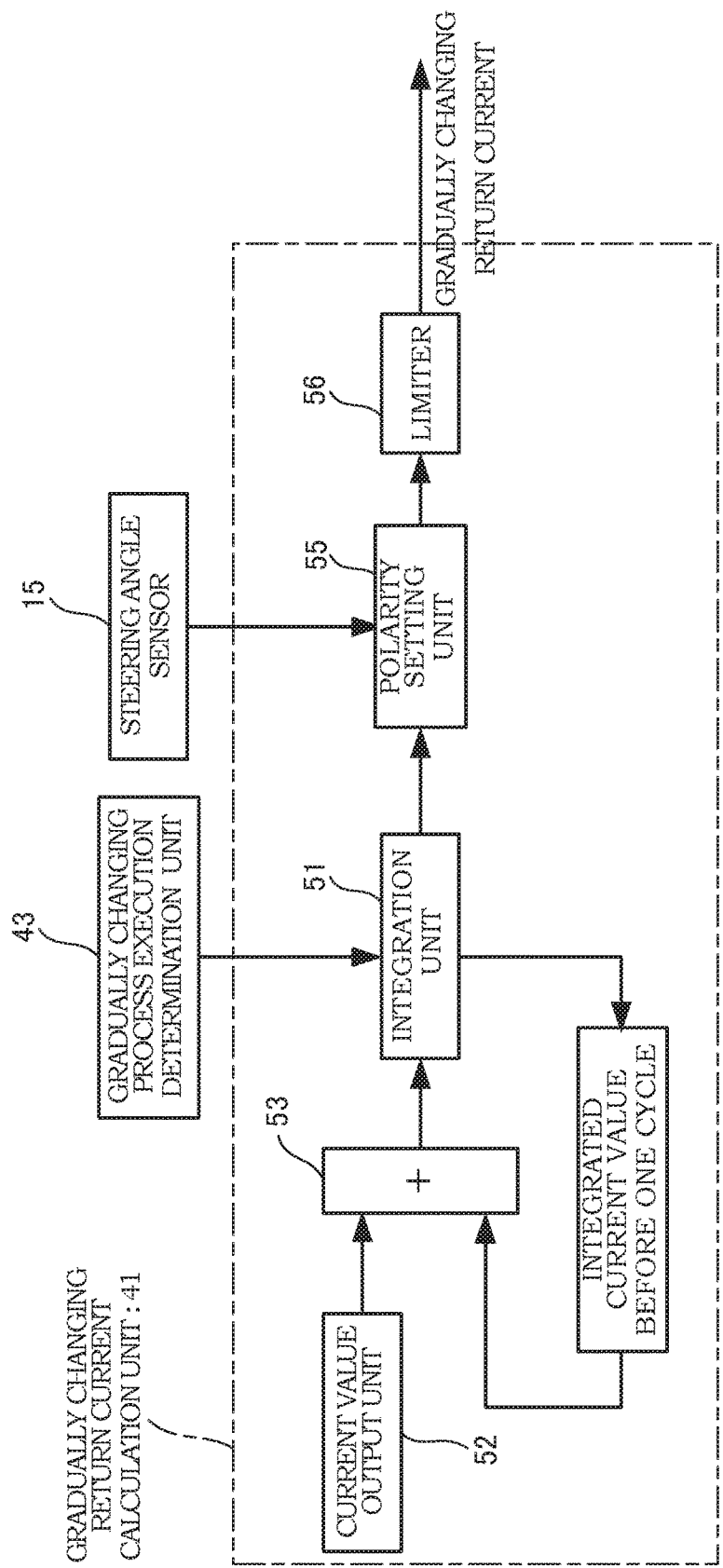
FIG. 5 is a control block diagram of a gradually changing return current calculation unit.
Figure 6:
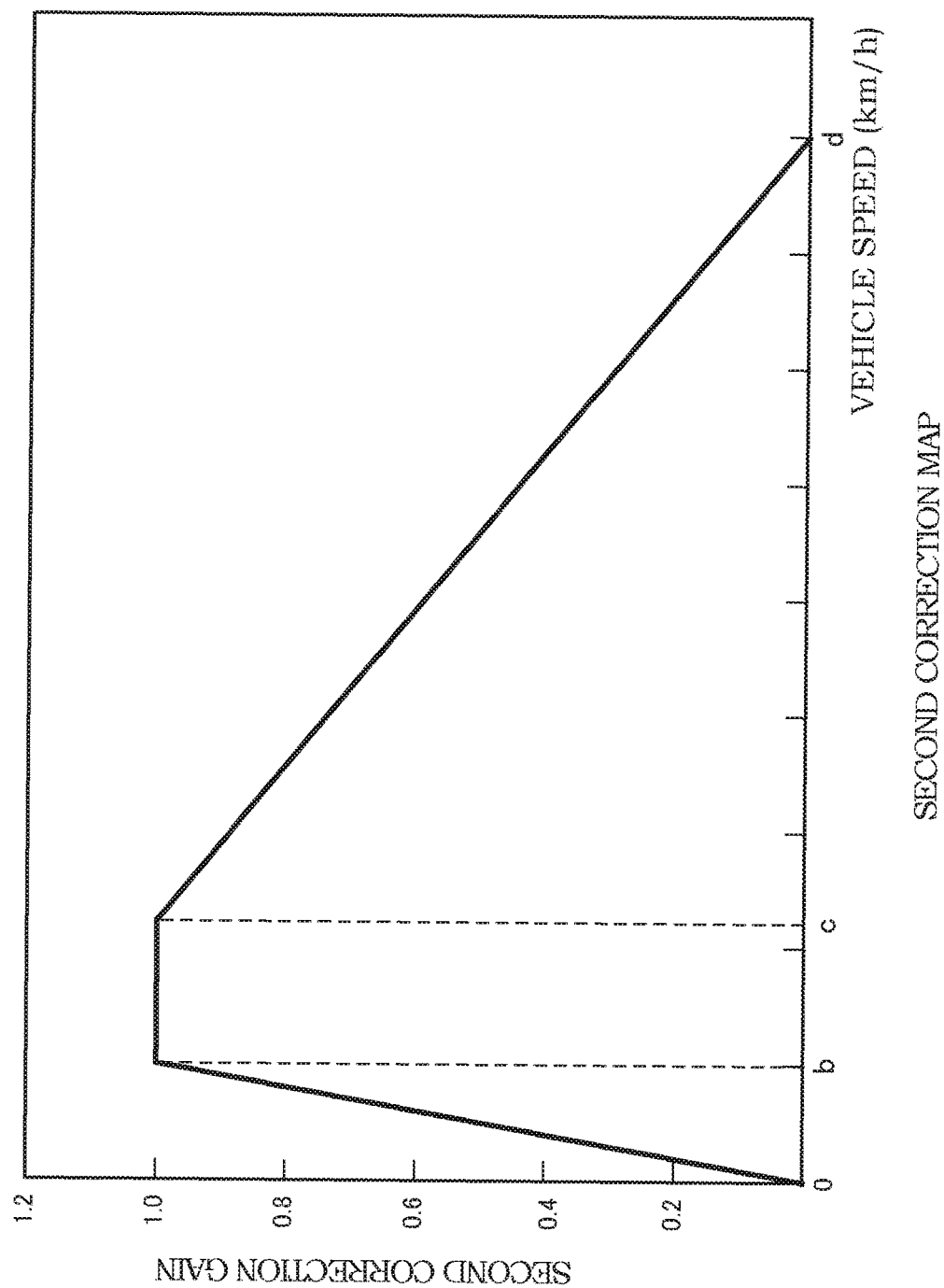
FIG. 6 is a second correction map chart for calculating a second correction gain.

Next, the gradually changing process is described in detail with reference to FIGS. 2, 5 and 6.

Generally, since a steering system is asymmetric when a steering angle of a steering wheel is on a rightward turning side and on a leftward turning side from a neutral position in an electric power steering device, there is possibly a left/right difference in a remaining steering angle of the steering wheel near the neutral position even if a return control is executed using only a basic return correction current. That is, there is a possibility of such a situation that the steering wheel returns to the neutral position at the time of a return made by releasing the steering wheel after the steering wheel is turned rightward, whereas the steering wheel does not completely return to the neutral position at the time of a return made by releasing the steering wheel after the steering wheel is turned leftward. To eliminate the left/right difference of the remaining steering angle of the steering wheel, it is thought to set a large basic return current on the side where the steering wheel does not completely return to the neutral position in the characteristic of the basic return current calculation map shown in FIG. 3. That is, it is thought to set the basic return current at different values on the right turning side and the left turning side. However, since the asymmetry of the steering system differs in each electric power steering device, it is not possible to apply certain specific setting of the basic return current to all electric power steering devices.

As just described, in the return control using only the basic return correction current, it is difficult to eliminate the left/right difference of the remaining steering angle of the steering wheel near the neutral position if the asymmetry of the steering system is large. Accordingly, in the present embodiment, the gradually changing process of adding the gradually changing return current to the basic return current is executed for the purpose of eliminating the left/right difference of the remaining steering angle of the steering wheel near the neutral position.

The gradually changing process is executed if an establishment of predetermined conditions are determined to hold by the gradually changing process execution determination unit 43.

The gradually changing return current calculation unit 41 calculates the gradually changing return current if the establishment of the predetermined conditions are determined by the gradually changing process execution determination unit 43. The predetermined conditions are described in detail later.

A gradually changing return current calculation method by the gradually changing return current calculation unit 41 is described in detail with reference to FIG. 5. If the establishment of the predetermined conditions are determined by the gradually changing process execution determination unit 43, an integration unit 51 starts integrating a fixed current value output from a current value output unit 52 in each control cycle. Specifically, the current value output unit 52 outputs the fixed current value set in advance to an addition unit 53 in each control cycle. The addition unit 53 adds the fixed current value output from the current value output unit 52 and an integrated current value before one cycle integrated by the integration unit 51 and outputs the sum to the integration unit 51. In this way, in the integration unit 51, the fixed current value output from the current value output unit 52 is integrated in each control cycle and the integrated current value integrated by the integration unit 51 gradually increases with a fixed gradient. As just described, the gradually changing return current calculation unit 41 calculates the gradually changing return current, which gradually increases, by integrating a fixed value at every predetermined time.

The integration in the integration unit 51 is continuously performed while the establishment of the predetermined conditions are determined by the gradually changing process execution determination unit 43. If the predetermined conditions are not established, the integrated current value of the integration unit 51 is cleared to 0 A.

The polarity of the integrated current value integrated by the integration unit 51 is set by a polarity setting unit 55. The polarity setting unit 55 sets the polarity on the basis of the detection result of the steering angle sensor 15 such that the integrated current value of the integration unit 51 has a value in a direction to return the steering wheel 1 to the neutral position. Specifically, if the steering wheel 1 is located on the right turning side from the neutral position and the polarity of the steering angle of the steering wheel 1 is positive, the polarity of the integrated value of the integration unit 51 is set to be negative so that an assist force acts in a direction to rotate the steering wheel 1 leftward. On the other hand, if the steering wheel 1 is located on the left turning side from the neutral position and the polarity of the steering angle of the steering wheel 1 is negative, the polarity of the integrated value of the integration unit 51 is set to be positive so that an assist force acts in a direction to rotate the steering wheel 1 rightward. As just described, the polarity of the integrated value of the integration unit 51 is set to be opposite to that of the steering angle of the steering wheel 1.

The integrated current value whose polarity is set by the polarity setting unit 55 is processed by a limiter 56 and output as the gradually changing return current to the multiplication unit 44 (see FIG. 2). In the limiter 56, a processing of limiting the integrated current value to a limit value set in advance is performed. The limit value set in the limiter 56 is preferably set as follows. Out of a case where the steering wheel 1 returns from the right turning side and a case where the steering wheel 1 returns from the left turning side, the integrated current value is not limited in the case where the steering wheel 1 is easy to return to the neutral position and the limit value is set to limit the integrated current value in the case where the steering wheel 1 is difficult to return to the neutral position. Instead of this, the limit values may be set to limit the integrated current value both in the case where the steering wheel 1 returns from the right turning side and in the case where the steering wheel 1 returns from the left turning side.

The second correction gain calculation unit 42 shown in FIG. 2 calculates the second correction gain for correcting the gradually changing return current on the basis of the detection result of the vehicle speed sensor 16. Specifically, the second correction gain corresponding to the vehicle speed input from the vehicle speed sensor 16 is calculated by referring to a second correction map shown in FIG. 6. The second correction map is not described since it is identical to the first correction map shown in FIG. 4.

The gradually changing return current calculated by the gradually changing return current calculation unit 41 and the second correction gain calculated by the second correction gain calculation unit 42 are multiplied by the multiplication unit 44 and output as the gradually changing return correction current from the multiplication unit 44.

The gradually changing return current is intended to eliminate the left/right difference of the remaining steering angle of the steering wheel 1 near the neutral position and the left/right difference of the remaining steering angle is likely to occur in the low-speed region of the vehicle where the self-aligning torque is small. Thus, by correcting the gradually changing return current by the second correction gain, the gradually changing return current effectively acts in the low-speed region where the left/right difference of the remaining steering angle is likely to occur, whereas the deterioration of a steering feeling can be prevented by not causing the gradually changing return current to act in the very slow-speed region and the medium/high speed region. Since the gradually changing return current is necessary particularly in the low-speed region where the self-aligning torque is small as just described, the value of d in the second correction map may be set at a speed smaller than the value of d in the first correction map.

A switching unit 45 is provided in the subsequent stage of the multiplication unit 44. The switching unit 45 outputs the gradually changing return correction current multiplied by the multiplication unit 44 if it is determined, by the gradually changing process execution determination unit 43, that the predetermined conditions are established, whereas the switching unit 45 outputs 0 A if it is determined that the predetermined conditions are not established. The gradually changing return correction current output from the switching unit 45 is processed by the low-pass filter 46 and the upper/lower limit value limiter 47 and output to the addition unit 50. The addition unit 50 calculates the return current by adding the basic return correction current output from the multiplication unit 24 and the gradually changing return correction current output from the switching unit 45. The return current output from the addition unit 50 is added to the assist base current by the addition unit 25.

Next, the gradually changing process execution determination unit 43 for determining whether or not to execute the gradually changing process is described in detail.

As shown in FIG. 2, the gradually changing process execution determination unit 43 determines whether or not the predetermined conditions are established on the basis of the detection result of the turn/return determination unit 40, the detection result of the steering angle sensor 15 and the detection result of the vehicle speed sensor 16. Specifically, if the return of the steering wheel 1 is determined by the turn/return determination unit 40, and an absolute value of the steering angle of the steering wheel 1 is within a predetermined range, and the vehicle speed is equal to or less than a predetermined speed and the detected value of the steering angle sensor 15 last time and that this time have the same polarity, it is determined that the predetermined conditions are established and the execution of the gradually changing process is permitted. As just described, the gradually changing process execution determination unit 43 permits the execution of the gradually changing process if all the four conditions are established.

The gradually changing process is executed only when the return of the steering wheel 1 is determined because the gradually changing process acts to increase the steering force by the driver when the steering wheel 1 is turned.

The gradually changing process is executed only when the absolute value of the steering angle of the steering wheel 1 is within the predetermined range because the gradually changing process is intended to eliminate the left/right difference of the remaining steering angle of the steering wheel 1 near the neutral position. Thus, the predetermined range is set near the neutral position of the steering wheel 1.

The gradually changing process is executed only when the vehicle speed is equal to or less than the predetermined speed because the left/right difference of the remaining steering angle is likely to occur in the low-speed region where the self-aligning torque is small.

The gradually changing process is executed only when the detected value of the steering angle sensor 15 last time and that this time have the same polarity because the gradually changing return current is cleared once if the detected value of the steering angle sensor 15 last time and that this time have the different polarities, i.e. the steering wheel 1 turns across the neutral position.

If all of the above four conditions are established, the integrated current value is integrated by the integration unit 51 of the gradually changing return current calculation unit 41, the gradually changing return current is calculated and the gradually changing return correction current is output from the switching unit 45 while those conditions are established. On the other hand, if even one of the four conditions no longer holds, the integrated current value of the integration unit 51 is cleared and 0 A is output from the switching unit 45.

Next, a method for determining the turn and the return of the steering wheel 1 by the turn/return determination unit 40 is described.

The turn/return determination unit 40 determines the turn and the return of the steering wheel 1 on the basis of the detection result of the torque sensor 12 and the calculation result of the motor rotation speed calculation unit 18. Specifically, the turn/return determination unit 40 determines the turn when the steering torque detected by the torque sensor 12 and the rotation speed of the electric motor 10 calculated by the motor rotation speed calculation unit 18 have the same polarity, i.e. a direction of the steering torque and that of the rotation speed of the electric motor 10 are the same. Such a determination can be made because the electric motor 10 generates an assist torque having the same polarity as the steering torque detected by the torque sensor 12 when the steering wheel 1 is turned.

On the other hand, the turn/return determination unit 40 determines the return when the steering torque detected by the torque sensor 12 and the rotation speed of the electric motor 10 calculated by the motor rotation speed calculation unit 18 have opposite polarities, i.e. the direction of the steering torque and that of the rotation speed of the electric motor 10 are opposite. Such a determination can be made because the steering torque detected by the torque sensor 12 remains to have the same polarity as the one during the return, whereas the electric motor 10 rotates in a direction opposite to the one during the return by the self-aligning torque when the steering wheel 1 is released after being turned.

Further, the turn/return determination unit 40 determines the return also when the rotation speed of the electric motor 10 calculated by the motor rotation speed calculation unit 18 is zero. Such a determination is made for the following reason. The rotation of the electric motor 10 may be stopped during the return of the steering wheel 1 if the friction of the gears is large, and the above determination is made to continue the gradually changing process even in such a situation.

Furthermore, the turn/return determination unit 40 determines the return also when the steering torque detected by the torque sensor 12 and the rotation speed of the electric motor 10 calculated by the motor rotation speed calculation unit 18 have the same polarity and the steering torque is near a neutral torque. Such a determination is made for the following reason. If the steering wheel 1 swiftly returns to the neutral position due to an inertial force in the case of a return made by releasing the steering wheel 1 after the steering wheel 1 is turned, the input shaft 7 coupled to the steering wheel 1 may slightly overtake the output shaft 3 on the side below the torsion bar 4 during the return. If the input shaft 7 overtakes the output shaft 3, the torsion bar 4 is twisted in a direction opposite to the one immediately after the release of the steering wheel 1. In such a case, the polarity of the steering torque and that of the rotation speed of the electric motor 10 become equal although the steering wheel 1 is being returned, and the turn is determined. To avoid such an erroneous determination, the return is determined if the steering torque is near the neutral torque even if the steering torque and the rotation speed of the electric motor 10 have the same polarity.

According to the above embodiment, the following functions and effects are exhibited.

If the establishment of the predetermined conditions are determined by the gradually changing process execution determination unit 43, the integrated current value is integrated by the integrating unit 51 of the gradually changing return current calculation unit 41 to calculate the gradually changing return current and the gradually changing return current is added to the basic return current to calculate the return current while the predetermined conditions are established. In this way, the return current to be added to the assist base current is calculated by adding the gradually changing return current to the basic return current.

Thus, even during the return of the steering wheel 1 on the side where the steering wheel 1 is difficult to return to the neutral position in the case where the steering system is asymmetric when the steering angle of the steering wheel 1 is on the rightward turning side and on the leftward turning side from the neutral position, the remaining steering angle near the neutral position of the steering wheel 1 is reduced by the action of the gradually changing return current added to the basic return current. Thus, the left/right difference of the remaining steering angle of the steering wheel 1 can be reduced.

Embodiments of this invention were described above, but the above embodiments are merely examples of applications of this invention, and the technical scope of this invention is not limited to the specific constitutions of the above embodiments.

In the above embodiment, the gradually changing process execution determination unit 43 permits the execution of the gradually changing process if all the four conditions are established. Instead of this, an execution permission condition of the gradually changing process may be that some of the four conditions are established. However, in such a case, it is desirably essential as the execution permission condition of the gradually changing process that the return of the steering wheel 1 is determined.

Further, the basic return current calculated by the basic return current calculation unit 20 and the gradually changing return current calculated by the gradually changing return current calculation unit need not necessarily be corrected on the basis of the vehicle speed. That is, the first correction gain calculation unit 21 and the second correction gain calculation unit 42 are not essential configurations.

This application claims priority based on Japanese Patent Application No.2014-019420 filed with the Japan Patent Office on Feb. 4, 2014, the entire contents of which are incorporated into this specification.

The invention claimed is:

1. An electric power steering device for a vehicle, the vehicle comprising a steering wheel to be operated by a driver, the steering wheel having a neutral position, the electric power steering device comprising:

an electric motor configured to generate an assist torque;

a steering angle sensor configured to detect a steering angle of the steering wheel;

a torque sensor configured to detect a steering torque input from the steering wheel; and a programmable controller programmed to:

calculate an assist base value on the basis of the steering torque;

calculate a basic return command value in a direction to return the steering wheel to the neutral position on the basis of the steering angle;

determine a turn from and a return to the neutral position of the steering wheel;

calculate a gradually changing return command value that is a value increasing at every predetermined time period and increases during a time period while the steering wheel is determined to be returning to the neutral position;

calculate a return command value by adding the gradually changing return command value to the basic return command value, and control the electric motor to generate the assist torque in accordance with a command value that is obtained by adding the return command value to the assist base value when the steering wheel is determined to be returning to the neutral position, wherein the controller is further programmed to calculate the gradually changing return command value by integrating a fixed value in each control cycle.

2. The electric power steering device according to claim 1, wherein:

the controller is further programmed to calculate a correction gain for correcting the gradually changing return command value on the basis of a vehicle speed of the vehicle.

3. The electric power steering device according to claim 1, wherein:

the controller is further programmed to determine that the steering wheel is returning to the neutral position when the steering torque and a rotation speed of the electric motor have different polarities or when the rotation speed of the electric motor is zero.

4. The electric power steering device according to claim 1, wherein:

the controller is further programmed to continue to calculate the gradually changing return command value while the steering wheel is determined to be returning to the neutral position and the steering angle is within a predetermined range.

5. The electric power steering device according to claim 1, wherein:

the controller is further programmed to continue to calculate the gradually changing return command value while the steering wheel is determined to be returning to the neutral position, and the steering angle is within a predetermined range and a vehicle speed of the vehicle is equal to or less than a predetermined speed.

6. The electric power steering device according to claim 1, wherein:

the controller is further programmed to calculate the gradually changing return command value while the steering wheel is determined to be returning to the neutral position, the steering angle is within a predetermined range, a vehicle speed of the vehicle is equal to or less than a predetermined speed, and a currently detected value of the steering angle has a same polarity as a previously detected value of the steering angle.

* * * * *